Inventor
Roger W. McBrien
by Bedell & Burgess
attys 3,145,876
UNITIZED TITRATION APPARATUS
Roger W. McBrien, 211 Hi Point Place, East Alton, Ill.
Filed May 28, 1962, Ser. No. 198,124
9 Claims. (Cl. 222—113)

The invention relates to apparatus for titrating liquids and is adapted for use generally in laboratories. The apparatus embodies improvements on the structure shown in Patent 2,933,376, issued to the present inventor.

It is desired to facilitate the withdrawal of an accurately measured amount of a liquid from a storage container.

Among the objects of the invention are to render the apparatus readily portable; to protect the contents of the apparatus from contact with the ambient air and to facilitate determining the precise amount of liquid titrated.

These and other detailed objects are attained by the structure illustrated in the accompanying drawings in which.

Figure 1:
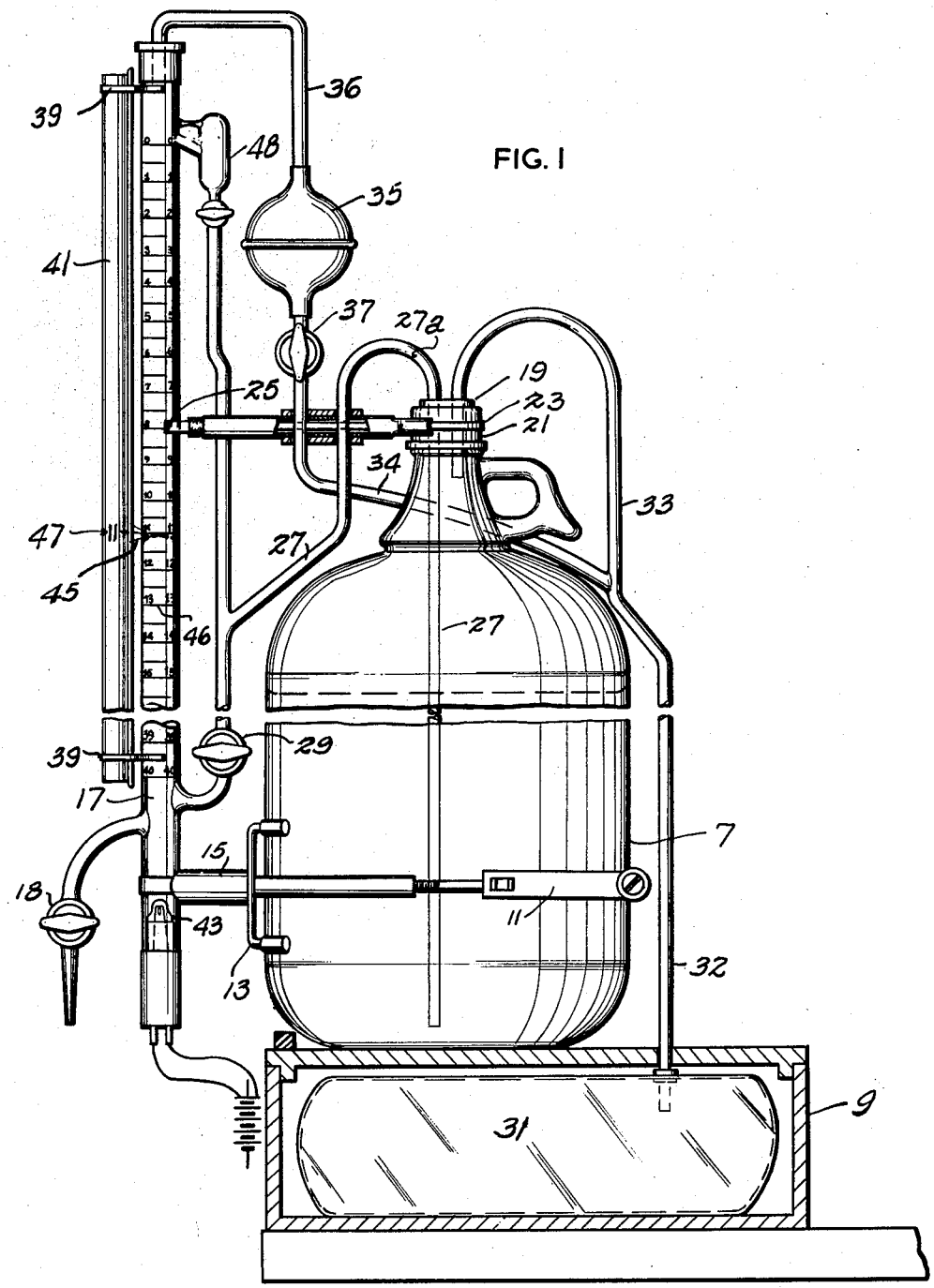
FIG. 1 is an elevation, partly in section, of a container with the titration equipment mounted thereon, the container being seated upon a box-like structure enclosing a flexible container for air or an inert gas subject to atmospheric pressure.

In the arrangement shown in FIG. 1, the container 7 is set on a box 9. A band clamp 11 is applied to the lower portion of container 7 and secures a bracket 13 including a handle or arm 15 which supports a buret 17 provided with an outlet cock 18. A stopper 19 in the neck of container 7 is enclosed by a cap 21 threaded onto the container neck. A flexible band clamp bracket 23 corresponding to that shown in applicant's Patent 2,914,-831 is mounted on and projects from cap 21 and terminates in a clip 25 seating an upper portion of the buret.

A conduit 27 leads from the lower portion of the container upwardly through stopper 19 and then downwardly through a transverse opening in clamp 23 into the lower portion of the buret and is provided with a shutoff cock 29. A plastic bag 31 in box 9 forms an air reservoir and is closed to the atmosphere outside the container. A conduit 32 leads upwardly from bag 31 with a branch 33 leading into the upper end of the container and a branch 34 leading through a transverse opening in clamp 23 to a compressible bulb 35 with an extension 36 leading into the top of the buret. A stop cock 37 is positioned in conduit 34.

Clips 39 on the buret support a plain screen 41 of plastic or ground glass. An electric lamp 43 is mounted in or adjacent to the lower end of the buret so that its light may travel inwardly of the buret and through any liquid therein. The meniscus M formed by the top surface of the liquid constitutes a deflector for the rays of light which then travel laterally as indicated at 45. The buret is marked with a scale 46 which measures by cubic millimeters or centimeters, as desired, the quantity of fluid in the buret, the scale reading downwardly from zero near the top of the buret.

With this light, scale and screen arrangement, the level of the liquid will be projected onto the screen to form an enlarged image 47 making possible a ready reading of the scale at the level of the meniscus and facilitating the operation of determining how much liquid has been withdrawn from the buret.

If enough liquid is fed from the container to the buret to rise above zero on the latter, the surplus may flow by gravity into an overflow compartment 48 and later be drained back to the lower end of conduit 27. Thus an automatic initial zero reading is obtained whenever the buret is recharged.

Operation: When the apparatus is not in use all of the stop cocks except 37 should be closed, the bulb 35 expanded and the interior of the container, buret, bulb and conduit all under atmospheric pressure.

To charge the buret, bulb 35 is squeezed manually compressing air or other gas in the buret 17, conduit 36, 34, 33 and in bag 31 and in the upper part of container 7. While bulb 35 is held compressed, cock 37 is closed.

Then the bulb is released, cock 29 is opened and liquid in container 7 flows due to the pressure in the container, through conduit 27 into the lower portion of the buret and upwardly therein. When the liquid level in the buret rises to zero, or any other level, as determined by the reading on the buret scale, or its projection on screen 41, cock 29 is closed. Then cock 37 is opened and the pressure throughout the system is equalized, leaving a column of liquid in the buret under atmospheric pressure.

Then cock 18 is opened and the desired amount of liquid withdrawn, the amount being determined by the reading on the buret scale. Withdrawal is repeated until the buret is near empty. Then, or at any other time, the buret may be recharged and discharged by repeating the operation described above.

If bag 31 and conduts 32, 33, 34, 36, bulb 35 and the upper portion of container 7 are filled initially with an inert gas, the reagent in the system will never be exposed to the atmosphere.

Figure 2:
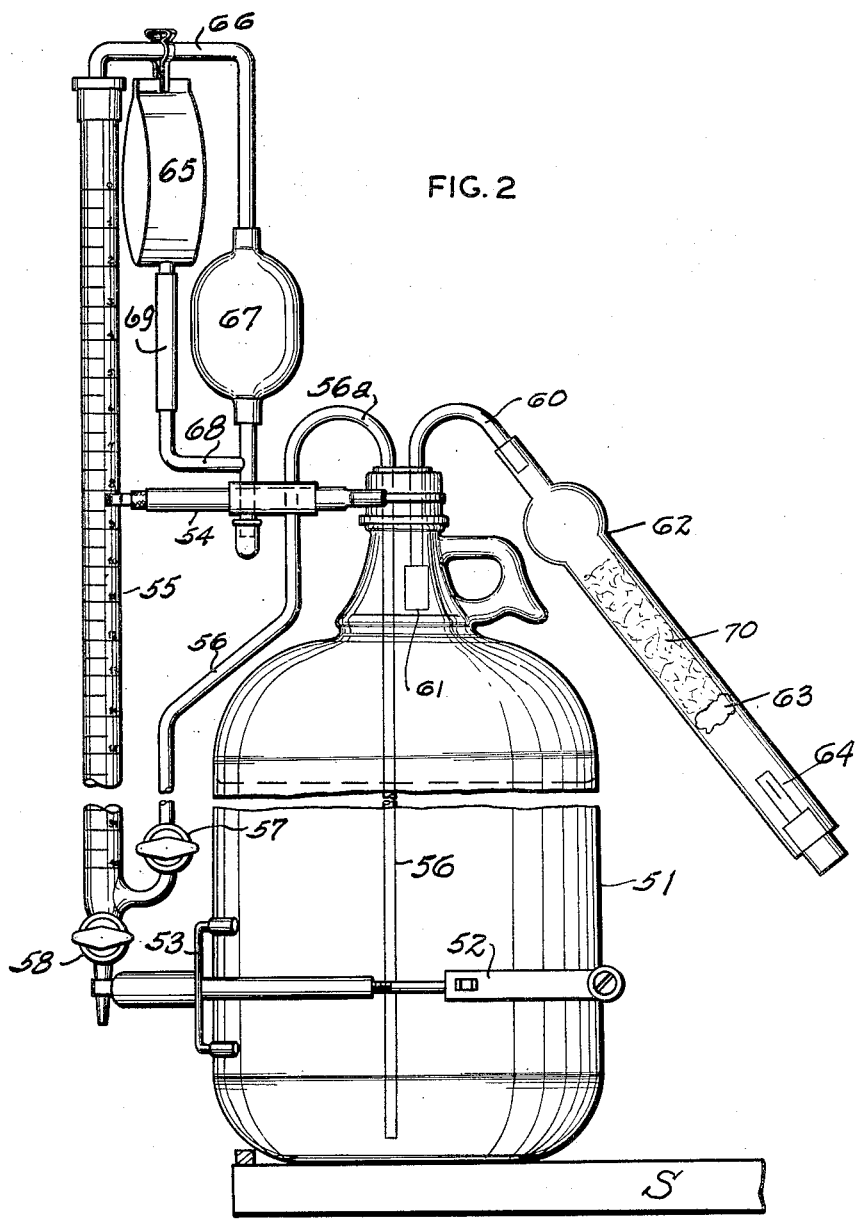
FIG. 2 illustrates a modified structure in which the container is mounted directly upon a table or shelf and the gas reservoir is supported from the container.

In the structure of FIG. 2, the container 51 is set directly on a table or shelf S. Clamp brackets 52, 53, 54, buret 55, conduit 56 and cocks 57, 58 are the same as corresponding parts previously described except the buret has no optional lamp and scale for producing a meniscus-magnified projection. An air inlet tube 60 with a bunsen check valve 61 provides for admission of air to the upper portion of the container when below atmospheric pressure but avoids discharge of air from the container. An optional attachment 62 is applied to the outer end of tube 60 and comprises a chamber containing loose asbestos fibres 70 saturated with sodium hydrate or other suitable material for absorbing moisture or carbon dioxide. A cotton plug 63 and another bunsen check valve 64 are desirable parts of attachment 62.

A flexible bag-like pressure reservoir 65 is suspended from a conduit 66 leading from the upper end of buret 55 to the upper end of a compressible bulb 67. A conduit 68 leads from bulb 67 to the lower part of reservoir 65 and includes a rubber tube 69 which is readily pinched manually to effect the same result as with stop cock 37 previously described.

Operation of this structure corresponds to that previously described. Bulb 67 is compressed, placing conduit 66 and reservoir 65 and buret 55 under equal above atmosphere pressure, reservoir 65 being inflated. Then tube 69 is pinched to hold the pressure in reservoir 65, and cock 57 is opened, lowering the pressure in the buret and conduit 66, as the bulb expands, until fluid rises in buret 55, due to pressure in container 51 and conduit 56. Then cock 57 is closed and tube 69 released, and fluid is drawn off through cock 58 as required.

Each arrangement described serves to avoid exposure of the fluid in the container to the ambient atmosphere and thereby prevents contamination and at the same time retains beneficial vapors of reagent in the container, conduits and buret irrespective of repeated withdrawals. This avoids formation and concentration of salts from loss of volatile elements of the reagent. This reduces or avoids necessity of frequency of testing and replenishing the reagent. The arrangement shown in FIG. 2 is less expensive than that of FIG. 1 and often will be satisfactory. Some reagents are very expensive and any reduction in loss of reagent is advantageous.

In each arrangement the container stopper is readily removed from the container neck, to accommodate refilling of the container, without disassembling the conduits. Such removal, and subsequent replacement, is accommodated by bending the upper portions 27a, 56a of the conduits which preferably are formed of flexible plastic tubing.

In each arrangement there is a closed-in system comprising a container for a reagent or other liquid and a reservoir for air or other gas, a liquid conduit with its ends connected to the container and the lower end of the buret, and an evacuating conduit with its ends connected to the reservoir and the upper end of the buret. Compression of the evacuating bulb and alternate closing and opening of the evacuating conduit valve establishes a partial vacuum or atmospheric pressure in the buret for charging the same with the liquid or subsequent gravity discharge therefrom. By squeezing the bulb with the connection to the reservoir closed, and valve to the buret opened, liquid drawn from the container into the buret and not titrated may be returned to the container through the same conduit 27, 56 as it passed through into the buret rather than through a different conduit filled with air. Beneficial vapors from reagent liquid in the system are retained in the container and buret and their connecting conduit which prevents formation and concentration of salts occurring when the volatiles are lost and the buret stays clean and clear. The liquid is not exposed to ambient air irrespective of filling and emptying of the buret. The apparatus forms a readily portable self-contained unit which is well adapted for use in a laboratory or for similar use.

Details of the structure may be changed substantially and some may be omitted, while retaining inventive features, and exclusive use of modifications coming within the scope of the claims is contemplated.

What is claimed is:

1. Titration apparatus comprising a container for liquid to be titrated,
    a buret mounted alongside the container,
    a first conduit leading from the inner portion of the container directly to the lower inner part of the buret,
    a closure for said conduit, a withdrawal valve in the lower part of the buret below said conduit,
    and evacuating structure comprising a gaseous reservoir,
    a second conduit leading from the upper end of the buret to said reservoir,
    a compressible resilient bulb in said second conduit,
    and a cutoff valve in said second conduit between the bulb and the reservoir.

2. Titration apparatus according to claim 1 in which the reservoir and the bulb and bulb-connected conduits are filled with an inert gas and are closed off from the container and the first conduit.

3. Titration apparatus according to claim 1 in which the conduits and buret are carried by the container, and the container is mounted upon a portable box-like structure in which the reservoir is received.

4. Titration apparatus comprising a container,
    a translucent upright buret having scale markings disposed lengthwise along its wall,
    means supplying the buret with liquid from the container,
    means for directing light upwardly in the buret,
    and a screen along side but spaced from the buret and receiving scale readings projected horizontally from the meniscus at the top of a liquid column in the buret and through the buret wall.

5. Titration apparatus according to claim 1 in which the buret, conduits, gaseous reservoir and valves are all mounted upon the container and the apparatus is a readily portable self-contained unit of which the container forms a supporting base.

6. A unitary titration apparatus comprising a container for fluid to be titrated,
    vertically spaced brackets attached to said container,
    a buret carried thereby alongside the container,
    a conduit extending from the lower inner part of the container upwardly and then downwardly into the lower part of the buret,
    a withdrawal cock in the buret below its connection to said conduit,
    a shutoff cock in the conduit between the container and the buret,
    a reservoir for gas supported by said buret above the level of said conduit,
    a second conduit leading from the upper end of the buret to said reservoir,
    a compressible bulb in said second conduit,
    and a stop cock in said second conduit between said reservoir and bulb.

7. Titration apparatus comprising a container for a supply of liquid,
    a reservoir for air or other gas,
    an upright buret having a controllable discharge outlet at its lower end,
    an evacuating conduit leading from the reservoir to the upper portion of the buret and having a compressible resilient bulb intermediate its ends, closing means in said conduit between said bulb and the reservoir,
    and a conduit for fluid leading from the lower portion of the container to the lower portion of the buret and having closing means near the latter.

8. Titration apparatus according to claim 7 in which the buret is provided with scale markings extending downwardly from a zero marking near the top of the buret,
    and the second conduit leads from the buret at the level of said zero marking to drain liquid automatically from the upper portion of the buret above said zero marking into the liquid supply.

9. Titration apparatus comprising a container for a supply of liquid and having an upstanding neck,
    vertically spaced brackets extending horizontally from the container,
    one of said brackets being secured to said neck and provided with a vertical passage spaced therefrom,
    an upright buret carried by the outer end portions of said brackets,
    a removable stopper in said neck,
    a flexible conduit extending from the interior of said container upwardly through said stopper and then downwardly through said passage to the lower portion of said buret,
    and evacuator means mounted on said one bracket and connected to the upper portion of the buret,
    said stopper being removable from said neck, by contortion of said conduit, while said container, buret and evacuator means are assembled with each other.

No references cited.